United States Patent [19]

Reasoner

[11] Patent Number: 5,570,612

[45] Date of Patent: Nov. 5, 1996

[54] CORE ADJUST WITH SLIDING REAR SPRING COVER

[75] Inventor: Michael Reasoner, Ortonville, Mich.

[73] Assignee: Teleflex, Inc., Plymouth Meeting, Pa.

[21] Appl. No.: 556,706

[22] Filed: Nov. 13, 1995

[51] Int. Cl.$^6$ .................................................... F16C 1/22
[52] U.S. Cl. ..................................... 74/502.6; 74/501.5 R
[58] Field of Search ............................... 74/502.4, 502.6, 74/502, 501.5 R

[56] References Cited

U.S. PATENT DOCUMENTS

| | | | |
|---|---|---|---|
| 4,223,564 | 9/1980 | Fawcett | 74/502.4 |
| 4,917,418 | 4/1990 | Gokee | 74/502.6 X |
| 4,936,161 | 6/1990 | Polando . | |
| 5,156,064 | 10/1992 | Truman . | |
| 5,161,428 | 11/1992 | Petruccello | 74/502 X |
| 5,174,170 | 12/1992 | Kato et al. . | |
| 5,178,034 | 1/1993 | Reasoner | 74/501.5 R X |
| 5,232,207 | 8/1993 | Champ et al. . | |
| 5,261,293 | 11/1993 | Kelley | 74/502.4 X |
| 5,295,408 | 3/1994 | Nagle et al. . | |
| 5,394,770 | 3/1995 | Boike et al. . | |

Primary Examiner—Charles A. Marmor
Assistant Examiner—Mary Ann Battista
Attorney, Agent, or Firm—Howard & Howard

[57] ABSTRACT

A motion transmitting remote control assembly (10) includes a length adjustment device on its core element (14) which is composed of a slider (20) and a housing (24). A push button lock (34) joins the slider (20) and housing (24) in a length adjusted position. A ball socket receptacle (28) attaches the housing (24) to a control member (30). The slider (20) is biased into the housing (24) by a compression spring (40). A backstop (42) extends rearwardly from the housing (24) to provide a bearing surface for the spring (40). The backstop (42) is slidably connected to the housing (24) by interlocking ears (48) and finger hooks (50). The sliding connection of the backstop (42) to the housing (24) allows the assembly (10) to be quickly converted to a spring-biased type length adjustment device. Alternatively, if a particular application requires omission of the compression spring (40) altogether, the backstop (42) can be omitted as well, and thereby permit operation as an unbiased length adjustment device (10). This is all accomplished using the same tooling, thereby reducing the cost to manufacture the remote control assembly (10) in both spring-biased and unbiased designs.

13 Claims, 3 Drawing Sheets

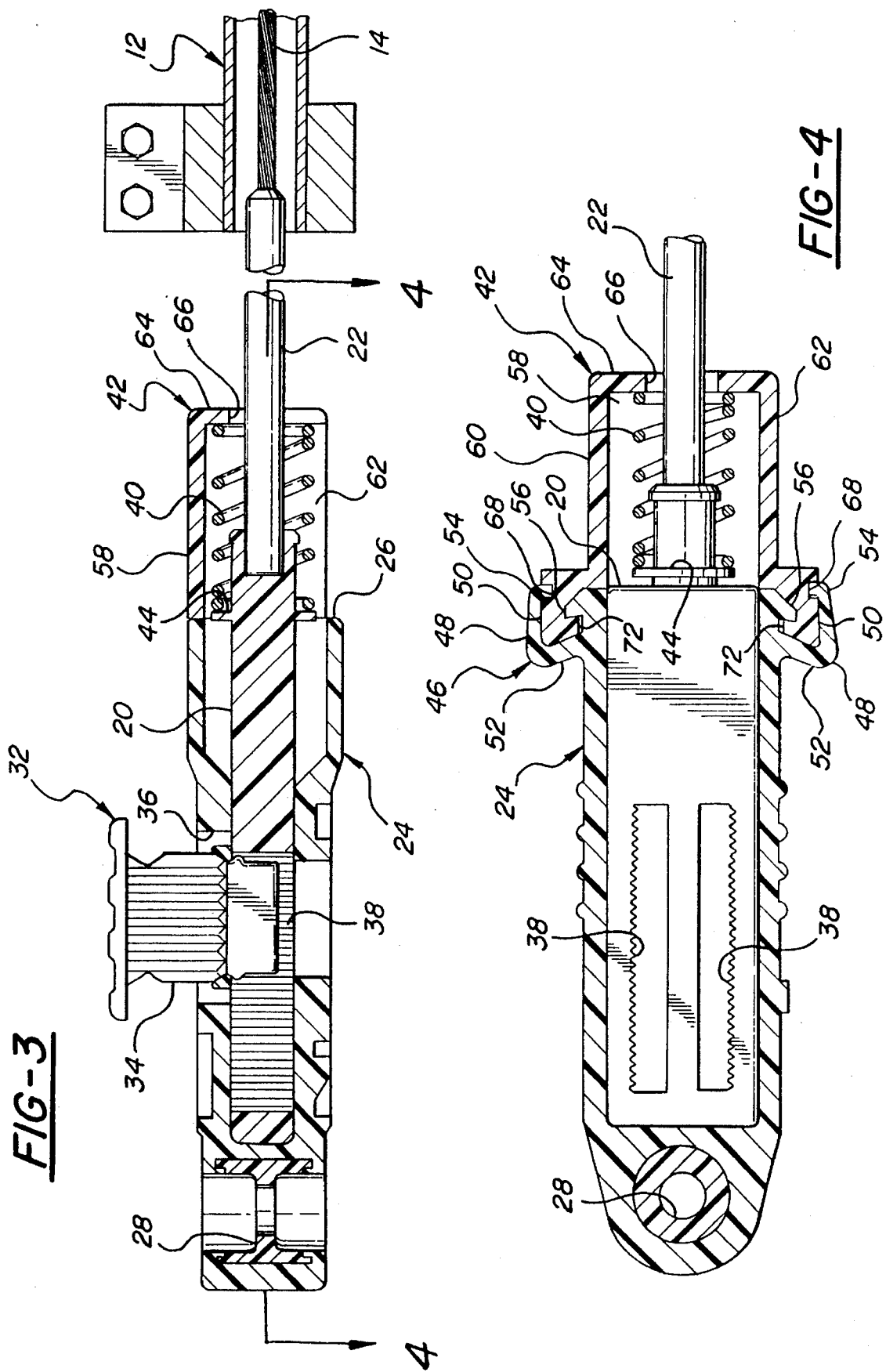

CORE ADJUST WITH SLIDING REAR SPRING COVER

TECHNICAL FIELD

The subject invention relates to a motion transmitting remote control assembly of the type for transmitting forces along a curved path, and more particularly to an improved core element length adjust mechanism therefor.

BACKGROUND OF THE INVENTION

Motion transmitting remote control assemblies of the type for transmitting motion in a curved path by means of a flexible motion transmitting core element are frequently used in applications to control the movement of something from a remote location. In the automotive industry in particular, transmissions, ventilation systems, fuel systems, hood releases and the like are frequently actuated by a motion transmitting remote control assembly from a remote actuating location. Such motion transmitting remote control assemblies include a protective sheath-like conduit which slidably supports an internal moving core element. The conduit is often of the composite type having an inner tubular liner defining the internal boundaries of a core passage, at least one metallic supportive lay wire wrapped helically about the liner, and an outer cover disposed about the lay wire.

In the illustrative example of automatic transmissions for the automotive industry, one end of the core element is attached to the shift lever located inside the passenger compartment, whereas the other end of the core element is attached directly to the transmission. The conduit effectively routes the core element through the passenger compartment, through the firewall, and exteriorly to the transmission.

Due to unavoidable manufacturing and assembly variations, the remote control assembly must be adjustable along its length to properly attach between the shifter and the transmission without undue tension or lash. From one automobile to the next along the assembly line, the routed distance between the shifter and the transmission may vary as much as several millimeters. Therefore, the remote control assembly must be able to compensate for these variations in the routed distance. This can be accomplished by either adjusting the length of the core element or of the conduit. In situations where adjusting the length of the core element is preferred, such adjustment is typically provided by way of a length adjusting mechanism at one of the ends of the core element where it attaches to the shifter or the transmission. These length adjusting mechanisms must be compact, and also quickly and easily adjustable so as not to slow or fatigue the assembly line workers.

Such core element adjustment devices generally fall into one of two categories: those with and those without a biasing spring. Suppliers of remote control assemblies to the automotive industry must supply components both with and without biasing springs, depending upon the particular requirements of the automobile. Tooling costs to manufacture such length adjustment devices can be extremely expensive. According to the prior art, separate tooling is required to manufacture both spring biased and non-spring biased length adjustment devices.

SUMMARY OF THE INVENTION AND ADVANTAGES

The subject invention comprises a motion transmitting remote control assembly of the type for transmitting motion along a curved path. The assembly comprises a conduit defining a central longitudinal axis. A core element is slidably disposed in the conduit, the core element has at least one end extending axially from the conduit. A slider is fixedly disposed on the end of the core element. A housing surrounds the slider and is axially moveable thereover to effectively adjust the overall length of the core element between maximum and minimum operative lengths. The housing includes a backstop. An attachment means is provided for attaching the housing to a control member. A locking means selectively interconnects the housing and the slider for coupling the housing and the slider in an adjusted operative length. A compression spring is operatively disposed between the backstop and the slider for urging the core element toward its minimum operative length. The improvement in the invention comprises a connection means for connecting the backstop to the housing.

The connection means allows the remote control assembly to be quickly converted to a spring biased type length adjustment device. Alternatively, if a particular application requires omission of the compression spring altogether, the connector means allows the backstop to be completely disconnected from the housing, and thereby operate as an unbiased length adjustment device. This is all accomplished using the same tooling, thereby reducing the cost to manufacture such remote control assemblies of both spring-biased and unbiased designs.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional side view of the slider and housing components;

FIG. 4 is a cross-sectional view taken along lines 4—4 of FIG. 3; and

DETAILED DESCRIPTION OF THE PREFERRED EMBODIMENT

Figure 1:
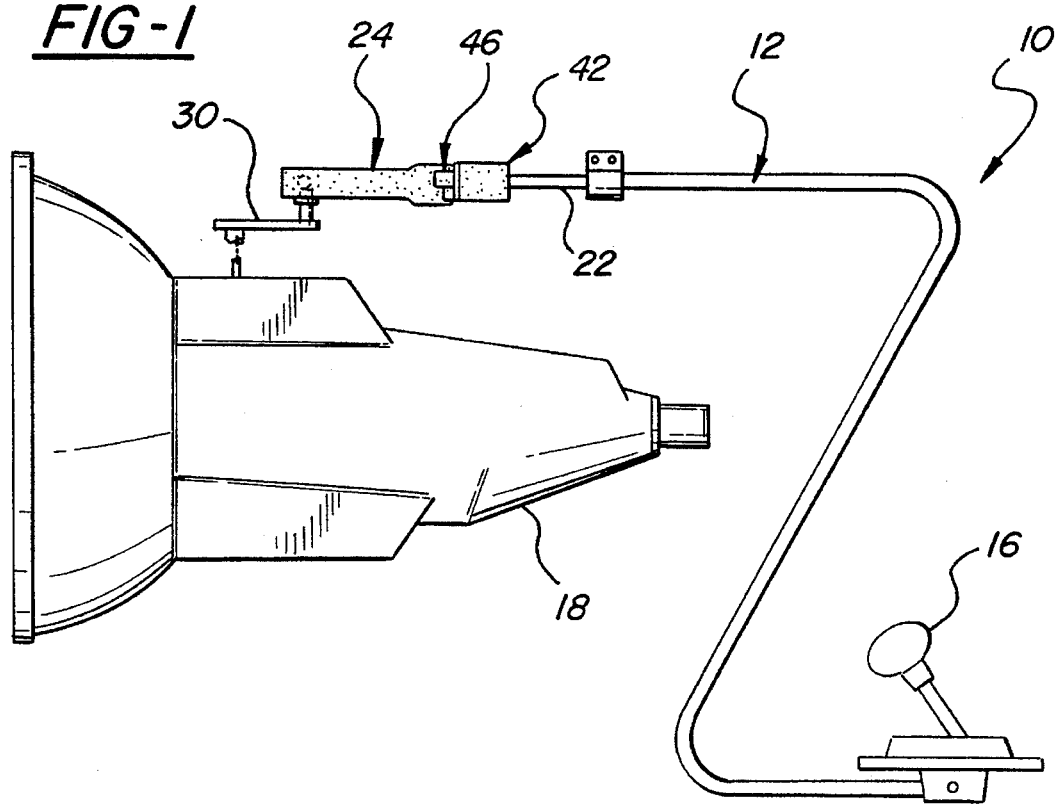
FIG. 1 is a schematic view showing the subject motion transmitting remote control assembly operatively connecting a console shifter to an automatic transmission.

Referring to the Figures, wherein like numerals indicate like or corresponding parts throughout the several views, a motion transmitting remote control assembly is generally shown at 10. The assembly 10 is of the type including a flexible conduit, generally indicated at 12, having a pair of spaced apart ends and defining a central longitudinal axis A. The conduit 12 is preferably of the composite type having an inner tubular liner defining the internal boundaries of a core passage, at least one metallic supportive lay wire wrapped helically about the liner, and an outer cover disposed about the lay wire. A flexible core element 14 is slidably disposed in the conduit 12. The core element 14 extends from both ends of the conduit 12 and attaches, respectively, to controlling and controlled members. For example, the controlling end of the core element 14 may be connected to a console shifter 16 and the controlled end of the core element 14 connected to an automatic transmission 18. Of course, those skilled in the art will appreciate other uses of a motion transmitting remote control assembly which includes a conduit 12 and a core element 14, and that many various alternative configurations of the preferred embodiment disclosed herein are possible without departing from the invention as defined in the appended claims.

Figure 5:
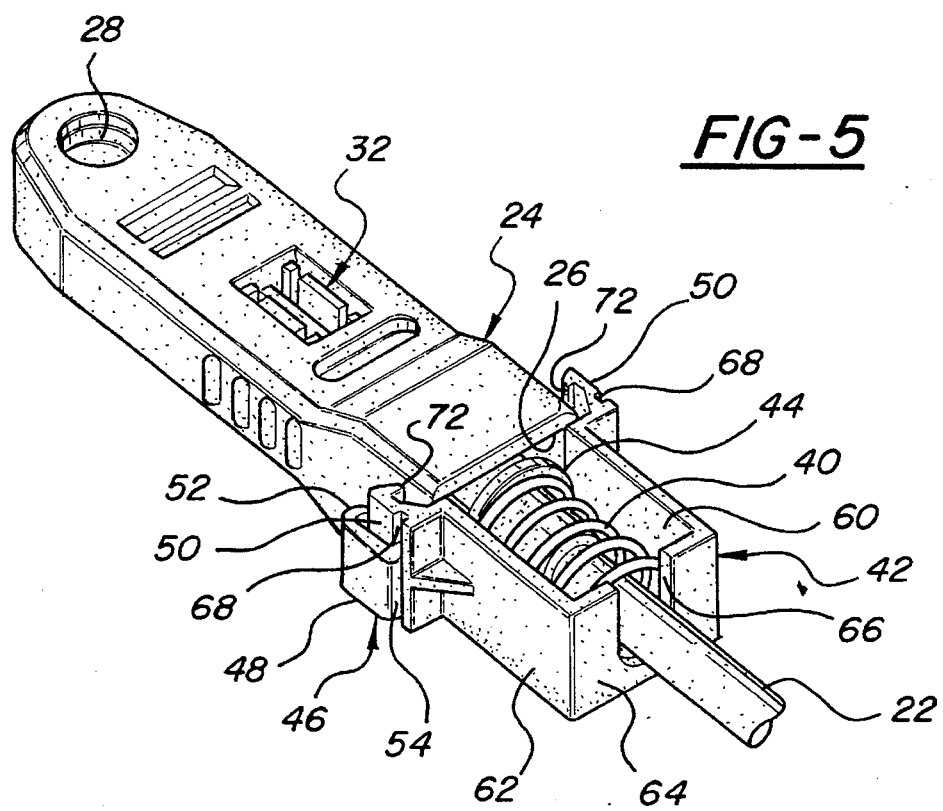
FIG. 5 is a perspective view showing the underside of the slider and housing components.
Figure 2:
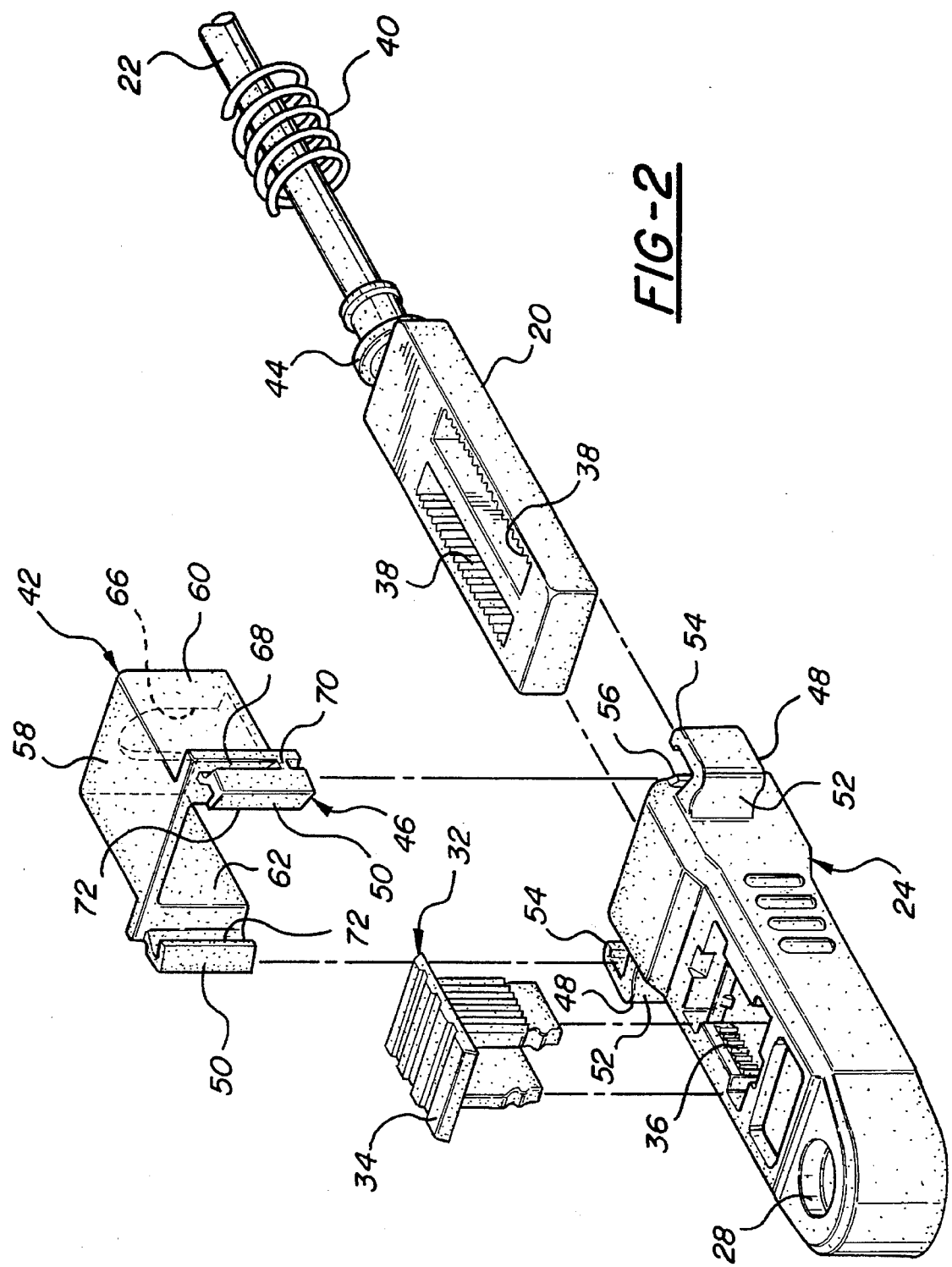
FIG. 2 is an exploded view of the slider and housing components which provide length adjustment for the core element.

Referring now to FIGS. 2 through 5, the subject assembly 10 is shown including a length adjustment device for effectively adjusting the overall length of the core element 14 between maximum and minimum operative lengths. The length adjustment device includes a slider 20 fixedly disposed on the end of the core element 14. In the case of a remote control assembly 10 used to transmit both tensile and compressive loads, the core element 14 is provided with a rigid extension 22 which will not buckle. The rigid extension 22 is at least partially embedded in the slider 20 to effect integration. A housing, generally indicated at 24, surrounds the slider 20 and is axially moveable therewith during the length adjustment operation. The housing 24 comprises a generally rectangular body having an open end 26 into which the slider 20 is received. At the other end of the housing 24, opposite the open end 26, is provided an attachment means 28 for attaching the housing 24 to a control member 30, such as on the transmission 18. While those skilled in the art will appreciate that the attachment means 28 may take various alternative forms, that shown in the drawing figures and preferred by the applicant includes a ball socket receptacle. Preferably, the slider 20 and housing 24 are made from an injection molded plastic.

A locking means, generally indicated at 32, is provided for selectively interconnecting the housing 24 in the slider 20 in an adjusted operative length. That is, when the assembly 10 is attached between the shifter 16 and the transmission 18, the length of the core element 14 is adjusted via relative movement between the slider 20 and housing 24. The locking means 32 couples the housing 24 directly to the slider 20 so that it remains in the adjusted length position providing motion transmission between the shifter 16 and the transmission 18 without lost motion. The locking means 32 includes a push button 34 having a series of teeth provided there along. The toothed push button 34 is fitted through an opening 36 in the top of the housing 24 where it is permitted to engage an elongated series of teeth 38 on the slider 20. For a more detailed description of the locking means 32, reference may be had to U.S. Pat. No. 5,394,770 to Boike, et al., issued Mar. 7, 1995, and assigned to the assignee of the subject invention, the disclosure of which is hereby incorporated by reference.

In the embodiment illustrated in the figures, the length adjustment device of the subject assembly 10 is constructed of the spring-biased type including a compression spring 40 for urging the core element toward its minimum operative length condition. The compression spring 40 is positioned between a backstop 42 on the housing 24 and a bearing flange or surface 44 of the slider 20. According to this arrangement, the spring 40 forces the tongue-like slider 20 more deeply into the housing 24, thereby effectively diminishing the operative length of the core element 14.

A connection means, generally indicated at 46, is provided for connecting the backstop 42 to the housing 24. The connection means 46 allows the backstop 42 to be loose-piece molded, apart from the housing 24, and stocked separately. The components of the assembly 10 can then be assembled either with or without the compression spring 40 and backstop 42, depending upon the specific requirements of the vehicle being serviced. Therefore, only one set of tooling is required to produce the slider 20 and housing 24 components, yet they can be readily converted between spring-biased and non-spring-biased operation. This ability to use the same components for both biased and unbiased operation reduces tooling costs by 50%.

The connection means 46 includes a pair of ears 48 extending from the sides of the housing 24. Similarly, the backstop 42 is provided with a pair of finger hooks 50 which interlock with the ears 48. Such interlocking is accomplished by sliding the backstop 42 into an anterior position relative to the housing 24, in a direction perpendicular to the central axis A. Each of the ears 48 includes a base portion 52 extending generally perpendicularly from the sides of the housing 24. The base portions 52 have a cantilever L-shape, and terminate in a perpendicularly extending tip portion 54. A small catch 56 is disposed adjacent each of the ears 48 on the sides of the housing 24, as shown in FIG. 4.

The backstop 42 includes a top wall 58, opposing side walls 60, 62 which adjoin the top wall 58, and a back wall 64 adjoining each of the sidewalls 60, 62 on the opposite end of the top wall 58. A U-shaped clearance opening 66 is formed in the back wall 64 to provide clearance for the rigid extension 22 of the core element 14. The interior of the backstop 42 is hollow, thereby forming a shell-like structure.

The finger hooks 50 are formed on each of the sidewalls 60, 62 and extend perpendicularly outwardly therefrom, as well as axially toward the housing 24. A channel 68 is formed in each of the finger hooks 50 to receive the tip portion 54 of the respective ear 48. A barb lock 70 is provided in each channel 68 to trap the respective ear 48 in place once the backstop 42 is attached to the housing 24. In other words, the barb lock 70 prevents disassembly of the backstop 42 from the housing 24. To further enhance resistance to axial forces imposed by the spring 40, each of the finger hooks 50 are provided with their own tip portions 72 which become trapped between the respective ear 48 and the associated catch 56. This, therefore, forms a double interlock between the backstop 42 and the housing 24, effectively resisting all foreseeable loading occurring at all anticipated temperature ranges.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A motion transmitting remote control assembly (10) for transmitting motion along a curved path, said assembly (10) comprising: a conduit (12) defining a central longitudinal axis (A); a core element (14) slidably disposed in said conduit (12), said core element (14) having at least one end extending axially from said conduit (12); a slider (20) fixedly disposed on said end of said core element (14); a housing (24) surrounding said slider (20) and axially moveable thereover to adjust the overall length of said core element (14) between maximum and minimum operative lengths, said housing (24) being independent from said conduit (12) and including a backstop (42); attachment means (28) for attaching said housing (24) to a control member (16); locking means (32) selectively interconnecting said housing (24) and said slider (20) in an adjusted operative length; a compression spring (40) operatively disposed between said backstop (42) and said slider (20) and at least partially enclosed in said housing (24) for urging said core element (14) toward said minimum operative length; and characterized by connection means (46) for selectively connecting said backstop (42) to said housing (24).

2. An assembly (10) as set forth in claim 1 wherein said connection means (46) includes a pair of ears (48) on said housing (24) and a pair of finger hooks (50) on said backstop (42) interlocking with said ears (48).

3. An assembly (10) as set forth in claim 2 wherein each of said ears (48) includes a base portion (52) extending generally perpendicularly from said housing (24), and a tip portion (54) extending generally perpendicularly from said base portion (52).

4. An assembly (10) as set forth in claim 3 wherein said housing (24) includes a catch (56) disposed adjacent each of said ears (48).

5. An assembly (10) as set forth in claim 4 wherein each of said finger hooks (50) includes an exterior channel (68) for receiving the tip portion (54) of the respective said ear (48).

6. An assembly (10) as set forth in claim 5 wherein each of said finger hooks (50) includes a tip portion (72) trapped between the respective said ear (48) and said catch (56).

7. An assembly (10) as set forth in claim 6 wherein each of said exterior channels (68) includes a barb lock (70) for preventing disassembly (10) of said respective ear (48).

8. An assembly (10) as set forth in claim 2 wherein said backstop (42) includes a top wall (58), opposing side walls (60, 62) adjoining said top wall (58), and a back wall (64) adjoining said side walls (60, 62).

9. An assembly (10) as set forth in claim 8 wherein said back wall includes a U-shaped clearance opening for said core element (14).

10. An assembly (10) as set forth in claim 2 wherein said slider (20) includes a bearing flange (44) or abutting said compression spring (40).

11. An assembly (10) as set forth in claim 2 wherein said attachment means (28) includes a ball socket receptacle.

12. An assembly (10) as set forth in claim 2 wherein said slider (20) includes a series of teeth (38), and said locking means (32) includes a toothed push button (34).

13. An assembly (10) as set forth in claim 2 wherein said core element (14) includes a rigid extension (22) partially embedded in said slider (20).

* * * * *